(12) United States Patent
Flood et al.

(10) Patent No.: US 10,638,768 B2
(45) Date of Patent: May 5, 2020

(54) SMOKE GENERATION POD

(71) Applicant: Mark Flood, Tampa, FL (US)

(72) Inventors: Mark Flood, Tampa, FL (US); Robinson Nunez, Riverview, FL (US)

(73) Assignee: Mark Flood, Tampa, FL (US)

( * ) Notice: Subject to any disclaimer, the term of this patent is extended or adjusted under 35 U.S.C. 154(b) by 157 days.

(21) Appl. No.: 15/820,336

(22) Filed: Nov. 21, 2017

(65) Prior Publication Data

US 2018/0139973 A1 May 24, 2018

Related U.S. Application Data

(60) Provisional application No. 62/425,093, filed on Nov. 22, 2016.

(51) Int. Cl.
| | | |
|---|---|---|
| *A23B 4/052* | (2006.01) | |
| *B01D 53/04* | (2006.01) | |
| *B01D 46/10* | (2006.01) | |
| *C12G 3/06* | (2006.01) | |
| *A23L 27/27* | (2016.01) | |

(52) U.S. Cl.
CPC ............ *A23B 4/052* (2013.01); *A23B 4/0523* (2013.01); *A23L 27/27* (2016.08); *B01D 46/10* (2013.01); *B01D 53/04* (2013.01); *C12G 3/06* (2013.01); *A23V 2002/00* (2013.01); *B01D 2253/108* (2013.01); *B01D 2257/7027* (2013.01); *B01D 2258/0275* (2013.01)

(58) Field of Classification Search
CPC ....... A23B 4/052; A23B 4/0523; A23L 27/27; A23V 2002/00; B01D 46/10; B01D 53/04; B01D 2253/108; B01D 2253/7027; B01D 2258/0275; C21G 3/06

USPC .......................................................... 431/6
See application file for complete search history.

(56) References Cited

U.S. PATENT DOCUMENTS

| | | | |
|---|---|---|---|
| 6,142,066 A | 11/2000 | Anders et al. | |
| 6,481,344 B1* | 11/2002 | Green | A23B 4/052 |
| | | | 99/482 |
| 6,705,213 B1* | 3/2004 | Thomas | A47J 37/0786 |
| | | | 99/467 |
| 8,574,648 B2 | 11/2013 | Joly | |
| 9,364,622 B2 | 6/2016 | Steelman et al. | |
| 2011/0005534 A1* | 1/2011 | Albino | A24B 13/00 |
| | | | 131/270 |
| 2011/0308521 A1 | 12/2011 | Kofford | |

(Continued)

FOREIGN PATENT DOCUMENTS

| | | |
|---|---|---|
| CN | 204653573 | 9/2015 |
| EP | 2033524 | 5/2015 |

*Primary Examiner* — Grant Moubry
*Assistant Examiner* — Benjamin W Johnson
(74) *Attorney, Agent, or Firm* — Larson & Larson, P.A.; Frank Liebenow; Justin P. Miller

(57) ABSTRACT

A smoke generation pod for use in a smoke generation system includes an enclosure that has there within a material such as wood that is heated or ignited by an igniter or arc housed within the smoke generation pod. The smoke generation pod has an input vent for accepting air and an output vent for distributing smoke. The smoke is routed to an object such as a glass (with or without a liquid there within) for infusing the smoke into the liquid or onto the object. In some embodiments, the output vent has a filter and, some such filters also remove some or all carcinogens from the smoke that is emitted.

14 Claims, 15 Drawing Sheets

(56) References Cited

U.S. PATENT DOCUMENTS

2016/0271347 A1\* 9/2016 Raichman ............. A61M 15/06
2016/0331913 A1\* 11/2016 Bourque ................ A61M 11/02

\* cited by examiner

SMOKE GENERATION POD

CROSS-REFERENCE TO RELATED APPLICATION

This application claims the benefit of U.S. provisional application No. 62/425,093 filed Nov. 22, 2016, the disclosure of which is incorporated by reference.

FIELD

This invention relates to the field of flavoring and more particularly to a system for generating smoke for flavoring of a food item such as liquor.

BACKGROUND

Many people appreciate tastes and smells that are provided by smoke. The smell of a fire burning, incense, meat cooked over charcoal all provide tastes and smells that please many people and enhance the flavor of what they eat.

There are several prior methods of providing such flavors. For example, cooking food over an open fire infuses some of the aromas from the smoke of the fire into the food, enhancing the flavor of the food. This is often performed using aromatic woods such as mesquite.

Another example is smoke provided as a liquid for adding to foods while cooking.

Still another example is a small, hand-held machine that is filled with wood pieces that smolders and produces smoke. The latter, is typically used to add smoke to liquor such as bourbon.

For adding a smoke flavor to a liquor, the liquor cannot be placed over an open fire and it is not acceptable to add a liquid such as adding smoke provided as a liquid. It is desirable to infuse smoke into the liquor or onto a glass that will eventually hold the liquor. Devices currently in the market accept a quantity of wood fragments, then the wood fragments are ignited to smolder for coating a glass with smoke, but this device has many drawbacks. These devices have no control of the incineration and an unknowing individual may use a material that is too flammable. These devices have no control as to the size and density of the material being smoldered and it is up to the user to use correct wood fragment sizes. These devices have no receptacles for supporting a glass during smoke generation. These devices have no control as to the amount of smoke generated. These devices have no filtering to prevent certain materials from traveling to the destination (glass), especially carcinogens. Further, the user of these devices must load the device with wood fragments/particles and later clean the devices of ashes.

What is needed is a system that will generate smoke in a controlled way while providing repeatable control to the generation of such smoke.

SUMMARY

In one embodiment, a smoke generation system is disclosed including a control circuit, a base unit, and a removable smoke generation pod. The control unit, within the base unit, controls the operation of the smoke generation system to generate smoke from a material provided within the smoke generation pod. Each smoke generation pod has there within a material such as wood that is heated or ignited, under control of the control circuit, to produce the smoke. The smoke is routed to an object such as a glass (with or without a liquid there within) for infusing the smoke into the liquid or onto the object (e.g. foodstuff).

In another embodiment, a smoke generation pod is disclosed including a housing that has an input vent, an output vent, and an internal chamber. A material (e.g. wood particles) is in the internal chamber. An electrical igniter is also within the internal chamber and in contact with the material. A plurality of electrical contacts is on an outside surface of the housing, each of the plurality of electrical contacts is electrically connected to the igniter. Upon application of an electric potential across the plurality of electrical contacts, the material emits smoke and the smoke emanates from the output vent as air replaces the smoke into the input vent.

In another embodiment, a method of generating smoke is disclosed including inserting a smoke generation pod into a machine, the smoke generation pod has a housing with an input vent, an output vent, and an internal chamber. The internal chamber has there within a material (e.g. wood fragments). The machine the provides an electrical potential to contacts on an outside surface of the housing that are electrically interfaced to an electrical igniter that is within the internal chamber and the electrical igniter is in contact with the material. Responsive to the electrical potential, the igniter heats the material and the material emits smoke. The machine inserts air into the input vent causing smoke to emanate from the output vent.

In another embodiment, a smoke generation pod is disclosed including a hermetically sealed housing that has an input vent, an output vent having a filter, and an internal chamber. The internal chamber contains a material such as wood particles. An electrical igniter is mounted within the internal chamber and is in contact with the material. Electrical contacts on an outside surface of the housing are electrically connected to the igniter such that upon application of an electric potential across the plurality of electrical contacts, the material emits smoke and the smoke emanates from the output vent as air replaces the smoke into the input vent.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
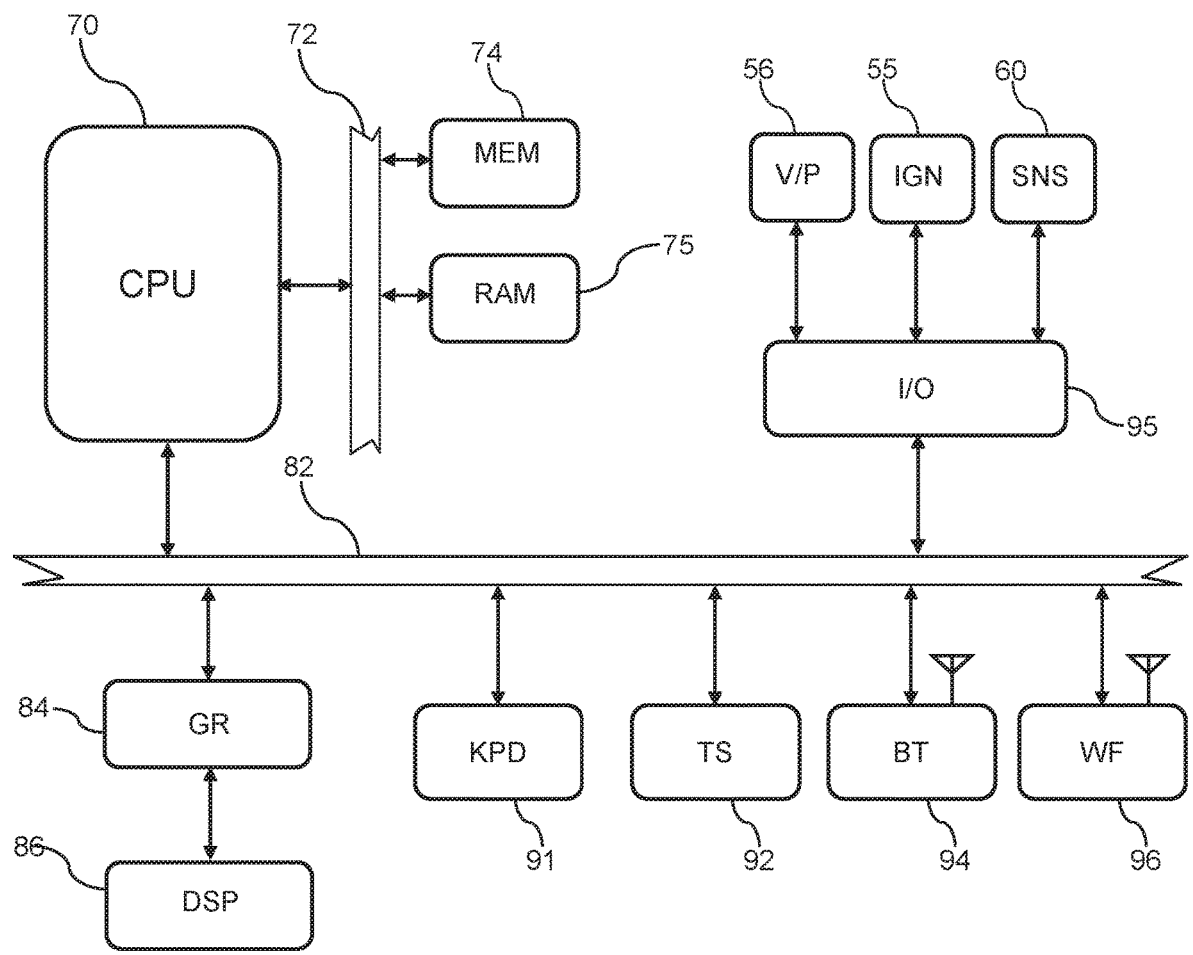
FIG. 1 illustrates a schematic view of a processor-based control system of the smoke generator.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a schematic view of a processor-based control system of the smoke generation system 10 is shown. In such, the smoke generation system 10 is described using a processor-based controller for providing operational and safety control. Although a processor-based control system is shown in FIG. 1, it is known to implement similar functionality in logic and electronics and any such control system is fully anticipated.

The processor-based controller represents a typical control system for monitoring and controlling the operation and smoke generation in the smoke generation system 10. This processor-based controller is shown in its simplest form. Different architectures are known that accomplish similar results in a similar fashion and the present invention is not limited in any way to any particular system architecture or implementation. In this exemplary processor-based control system, a processor 70 executes or runs programs in a random access memory 75. The programs are generally stored within a persistent memory 74 and loaded into the random-access memory 75 when needed. The processor 70 is any processor, typically a processor designed for embedded operation such as a micro-controller. The persistent memory 74 and random-access memory 75 are connected to the processor by, for example, a memory bus 72. The random access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some embodiments, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a graphics adapter 84 and keypad inputs 91 and/or a touch screen interface 92. The graphics adapter 84 receives commands from the processor 70 and controls what is depicted on the display 86. The keypad inputs 91 and/or touch screen interface 92 provide navigation and selection features.

In general, some portion of the persistent memory 74 is used to store programs, executable code, and data, etc. In some embodiments, other data is stored in the persistent memory 74 such as audio files, video files, text messages, etc.

The processor-based control system includes input/output ports 95 for sensing and controlling various devices within the smoke generation system 10. For example, the input/output ports 95 monitor and control operation of valves/pumps 31/31A through an input 56, monitor and control operation of the ignition device driver 55, and read sensors 60 to monitor the position/operation of various components. For example, before initiating operation of the ignition device driver 55, the processor-based control system reads a sensor interface 60 to the smoke pod door 14 (see FIG. 4A) to make sure that the smoke pod door 14 is closed.

The processor 70 controls the voltage and/or current provided to the ignition device 59 by the ignition device driver 55, thereby controlling the duration and temperature of the ignition device 59 and, therefore, the amount and density of the smoke generated.

The peripherals shown are examples and other devices are anticipated as known in the industry such as speakers, microphones, USB interfaces, cameras, microphones, a Bluetooth transceiver 94, a Wi-Fi transceiver 96, etc., the details of which are not shown for brevity and clarity reasons.

In some embodiments, the processor-based controller includes a Bluetooth transceiver 94, a Wi-Fi transceiver 96, or both. Having data communications between the smoke generation system 10 and other devices such as a cellular phone (not shown) or personal computer (not shown) enable control and status from a connected device. For example, an application running on a cellular phone communicates over the Bluetooth radio 94 and/or the Wi-Fi radio 96, providing a richer user interface.

Figure 2:
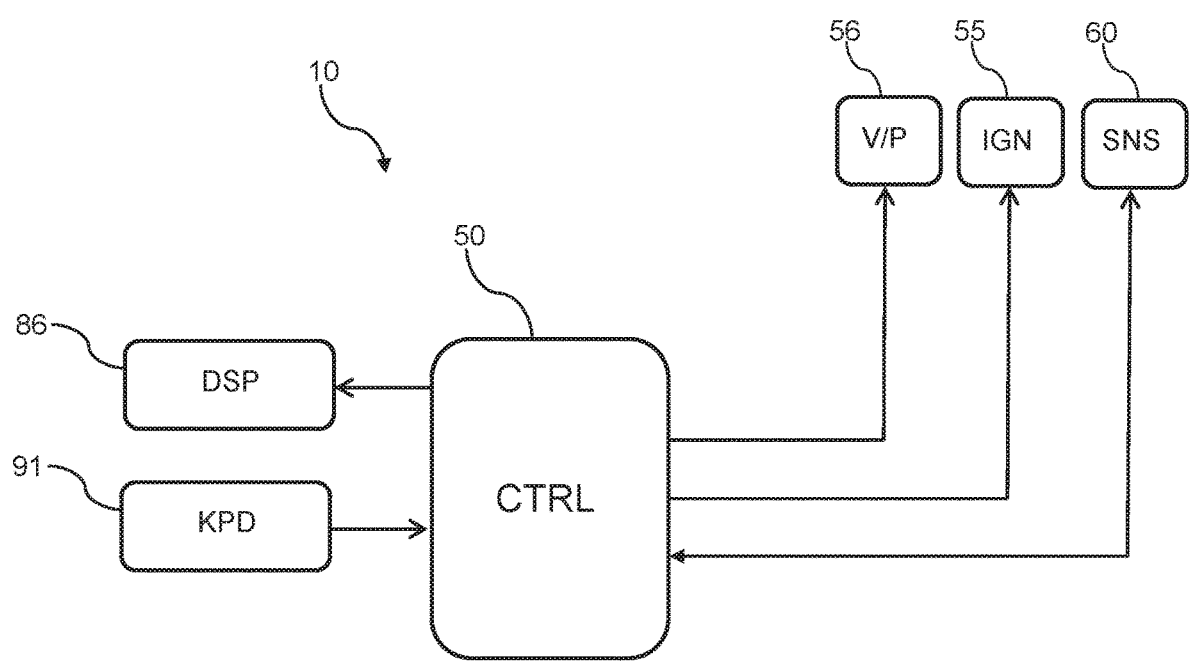
FIG. 2 illustrates a block diagram of the smoke generator.

Referring to FIG. 2, a block diagram of the smoke generation system 10 is shown. In this, a controller 50 (e.g., processor-based controller or discrete component such as logic-array based) is interfaced to a display 86 and a keypad 91. The controller 50 presents information on the display 86 such as instructions, warnings, status, progress, etc. The keypad 91 accepts user inputs to initiate generation of smoke, to stop generation of smoke, etc. In some embodiments, the keypad 91 is replaced by a touch screen 92 overlaid on the display 86.

The controller 50 electrically controls internal pumps and valve operation through a valve/pump driving circuit 56. Likewise, the controller electrically controls the igniter 59 (see FIG. 3) through an ignition device driver 55.

Various sensors (e.g. identification sensor reader 61—see FIG. 3, and lid-closed sensor, not shown) are read through a sensor interface 60.

Figure 3A:
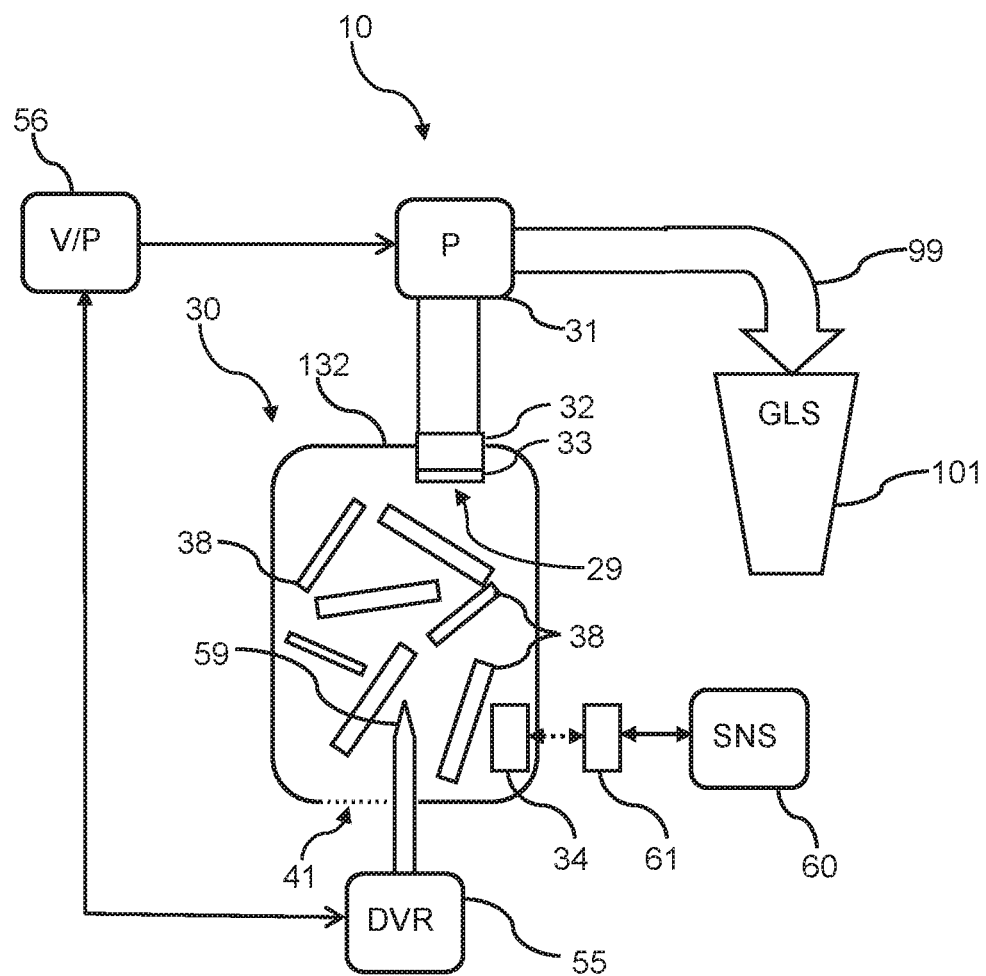
FIGS. 3A and 3B illustrate block diagrams of the smoke generation pod of the smoke generator.
Figure 3B:
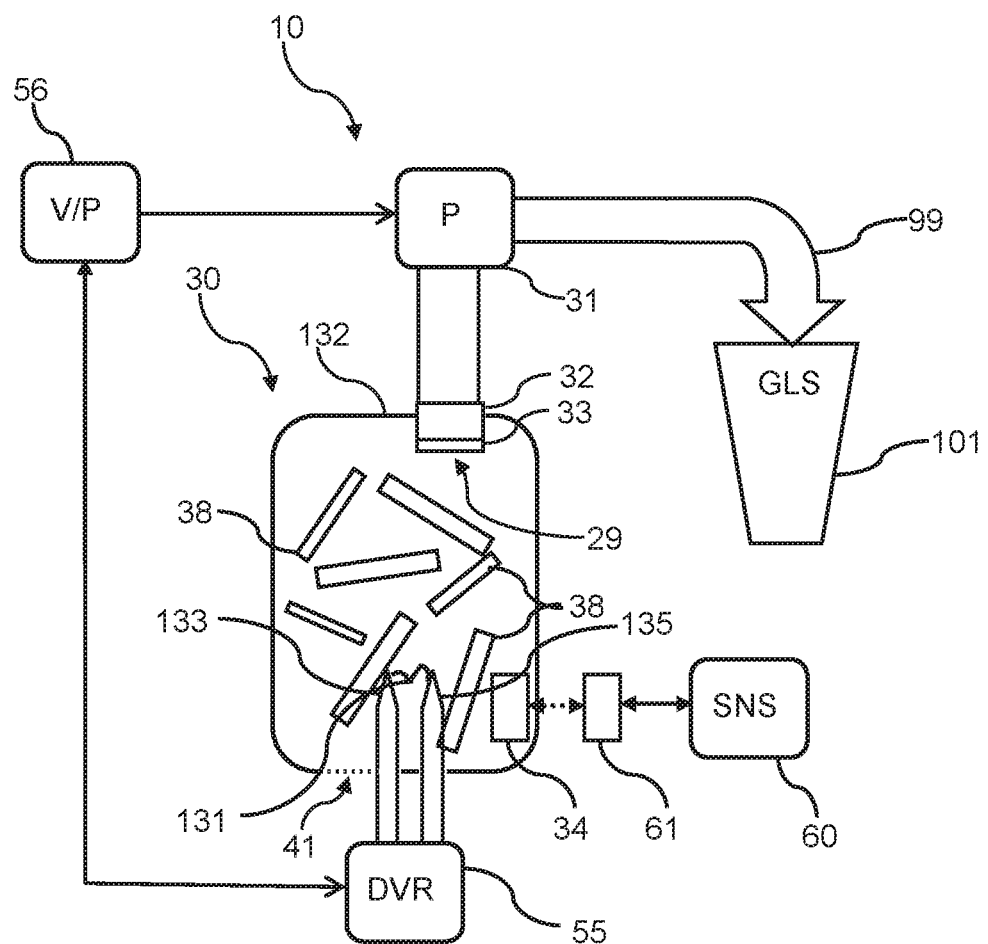

Referring to FIGS. 3A and 3B, block diagrams of the smoke generation pod 30 of the smoke generation system 10 are shown in operation. The smoke generation pod 30 contains a material 38 that is heated/ignited until the material smolders and/or burns, thereby producing the smoke 99. The material 38 is any material 38 that produces the desired smoke such as wood (e.g. oak, mesquite, and hickory), herbs (e.g. mint, cardamom, basil, cilantro, and garlic), and plant matter (e.g. hemp, tree bark, and roots).

The material 38 is held and contained within an enclosure 132 of the smoke generation pod 30. The smoke 99 is extracted from the smoke generation pod 30 through an output vent 29 that, in some embodiments, includes a mesh filter 33. The mesh filter 33 prevents ashes from escaping during smoke generation and after the process is complete. In some embodiments, a second filter 32 also filters out smaller ash particles (e.g. the second filter 32 is made of cellulose acetate fiber material), but in some embodiments, the second filter 32 also removes some carcinogens that form from the combustion of the material 38. For example, the combustion of wood produces polycyclic aromatic hydrocarbons (PAHs) which are known carcinogens. Is one such embodiment, the second filter 32 includes or is made of silica-alumina (zeolite) to remove some or a majority of the polycyclic aromatic hydrocarbons (PAHs), thereby reducing carcinogens in the smoke 99.

It is fully anticipated that the location of the mesh filter 33 and the second filter 32 be in any suitable location in the path of the smoke 99. In the embodiments shown, the mesh filter 33 is integrated into the smoke generation pod 30 and the second filter 32 is integrated into the pod cavity 19 of a smoke generating device, though it is equally anticipated that the second filter 32 is integrated into the smoke generation pod 30.

In some embodiments, the smoke 99 is urged out of the smoke generation pod 30 using a pump 31 that is controlled by the valve/pump driving circuit 56. The pump either extracts the smoke 99 from the output vent 29, in which case air enters the input vent 41, or the pump forces air into the input vent 41, which in turn forces the smoke 99 out of the output vent 29. The smoke 99 is routed to a glass 101 or other object such as foodstuff, either empty glass 101 or a glass 101 containing a liquid.

The material 38 is heated/ignited by an igniter 59 (as in FIG. 3A) such as a resistive heating element, a spark generator, or an electric arc 131 (as in FIG. 3B), though any electrically operated igniter is anticipated. For example, one anticipated igniter is a resistive heating element that heats the material 38 to a high temperature when electric current flows through a filament. Another example is a spark generator that uses a short pulse of high voltage electricity that generates a spark over a gap between two electrodes. In such, it is anticipated that the spark is near a flammable material such as wood chips or other. As certain types of the materials 38 are difficult to ignite/smolder from periodic sparks, in some embodiments, the material 38 includes another material that is easier to ignite. In some embodiments, such high voltage pulses are delivered either from a pulse transformer (e.g. as used with a Xenon flash tube) or through excitation of a piezo material (e.g. as commonly used in outdoor grills). Another example of an igniter is an electric arc 131, in which sufficient electric voltage potential is delivered between two electrodes 133/135, causing an electric arc to form across the electrodes. In such, the electric arc 131 is sufficient to initiate ignition/smoldering, the material 38 includes another material that is easier to ignite to aid in the ignition/smoldering.

Being that the igniter 59 requires either significant electrical current (resistive heating element) or significant electrical voltage (electric arc), it is anticipated that, in some embodiments, a high current and/or high voltage ignition device driver 55 provides such electrical current and electrical voltage.

For verification and other uses, in some embodiment, the smoke generation pod 30 includes an identification device 34 or an encoded value (e.g. a barcode or QR code) that is read by an identification sensor reader 61. Data from the identification device 34 that is sensed/read by the identification sensor reader 61 is sent to the control system through the sensor interface 60. In some such embodiments, the identification device 34 is a radio frequency identification device (RFID).

In some embodiments, the identification device 34 is writable, allowing the smoke generation system 10 to write and/or overwrite data stored within the identification device 34. In some such embodiments, the identification device 34 is a writable radio frequency identification device (RFID). Having writable memory in the identification device 34 enables a usage count that is associated with each smoke generation pod 30. For example, by writing an initial value in the writable memory of the identification device 34, then each time the corresponding smoke generation pod 30 is used, the usage count is decremented, then once the usage count reaches zero, the corresponding smoke generation pod 30 is disabled and will no longer be usable. In such embodiments having a usage counter, it is preferred that the writable memory of the identification device is write-once memory (e.g. the memory can only be changed from a zero to a one or vice versa. In this way, it is more difficult for a counterfeiter to reuse smoke generation pods.

In some embodiments, data from the identification device 34 includes the type of material 38 present in the smoke generation pod 30 (e.g. an encoding for hickory, a different encoding for mesquite, etc.). This provides for displaying the type of material 38 contained in the smoke generation pod 30 on the display 86 for user confirmation, etc. Further, upon reading the type of material 38 within the smoke generation pod 30, the processor 70 makes adjustments to the power provided to the igniter 59/131 to compensate for different types if the materials 38 and/or controls air flow through the smoke generation pod 30. For example, more power is provided for a denser type of the material 38 such as oak and less power is provided for a less dense type of the material 38 such as mint leaves. More air flow is provided for a slower burning type of the material 38 such as oak and less airflow is provided to a faster burning type of the material 38 such as herbal leaves.

In some embodiments, data from the identification device 34 includes parameters for generation of smoke from the material 38 present in the smoke generation pod 30 (e.g. suggested temperature, pump flow rate, etc.). This provides for optimum control of the igniter 59 or electric arc 131 depending upon the material 38 within the smoke generation pod 30.

In some embodiments, data from the identification device 34 includes a serial number or identification of the smoke generation pod 30. This provides verification that the smoke generation pod 30 is an authentic product and not a duplicate that may pose a safety risk.

In some embodiments, writable data in the identification device 34 includes a usage register. After using the smoke generation pod 30, the controller initiates writing (or overwriting) of data within the identification device 34. This provides a way to assure that the smoke generation pod 30 is not used multiple times. In such, it is preferred that the usage register is a write-once memory location so that it cannot be overwritten to indicate that the smoke generation pod 30 has not been used.

Figure 4A:
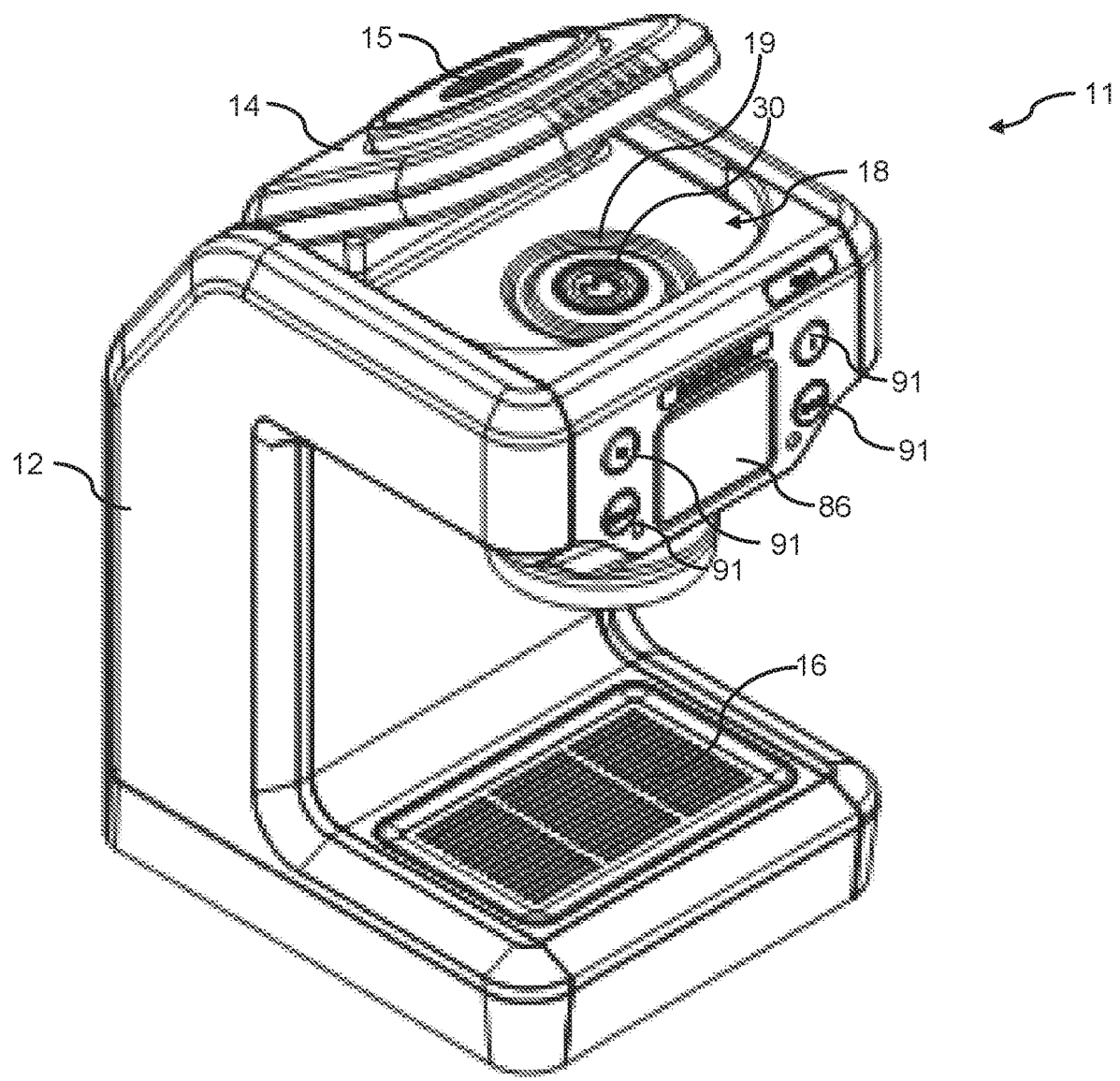
FIGS. 4A and 4B illustrate perspective views of an exemplary housing for the smoke generator.
Figure 4B:
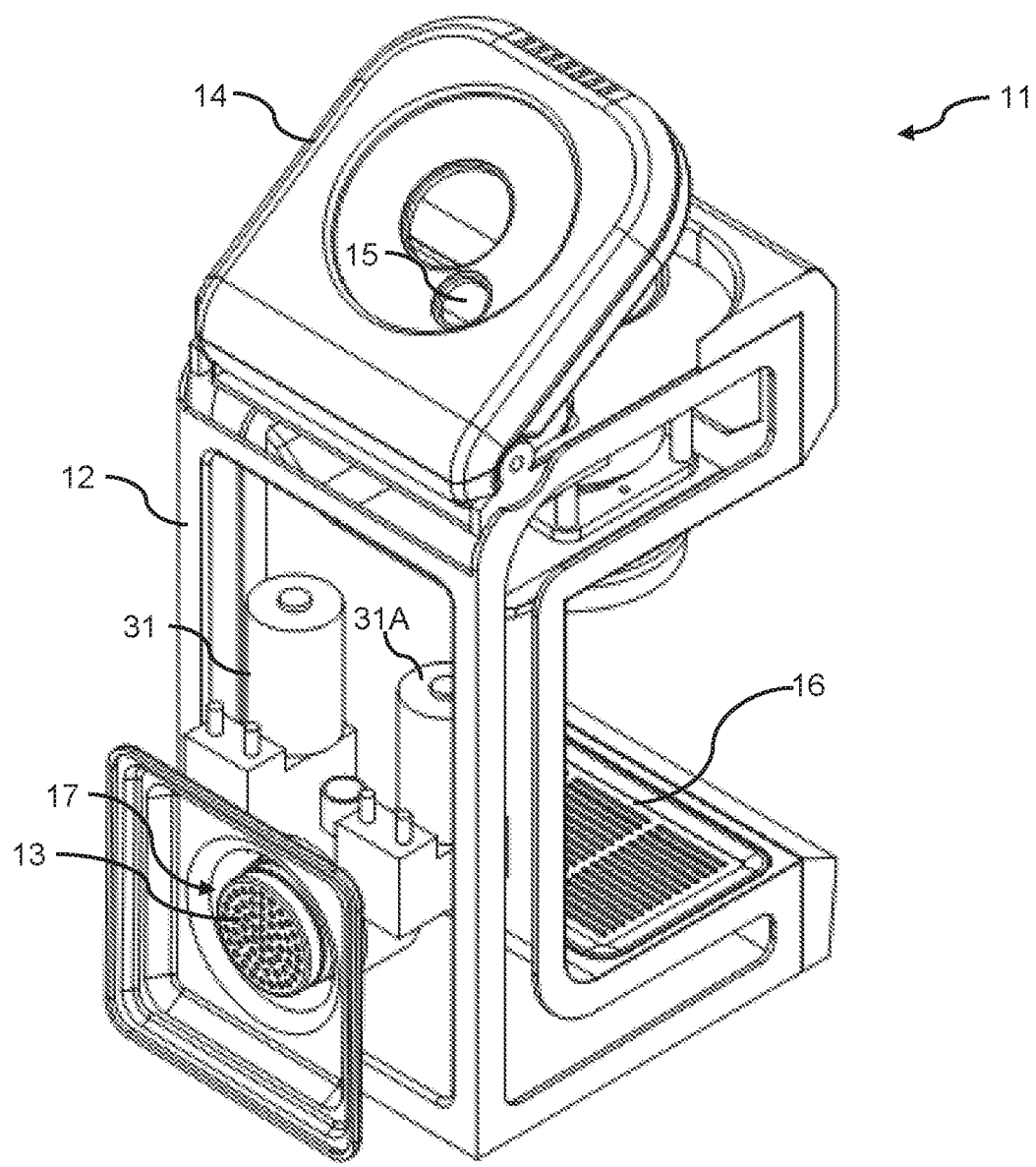
Figure 5A:
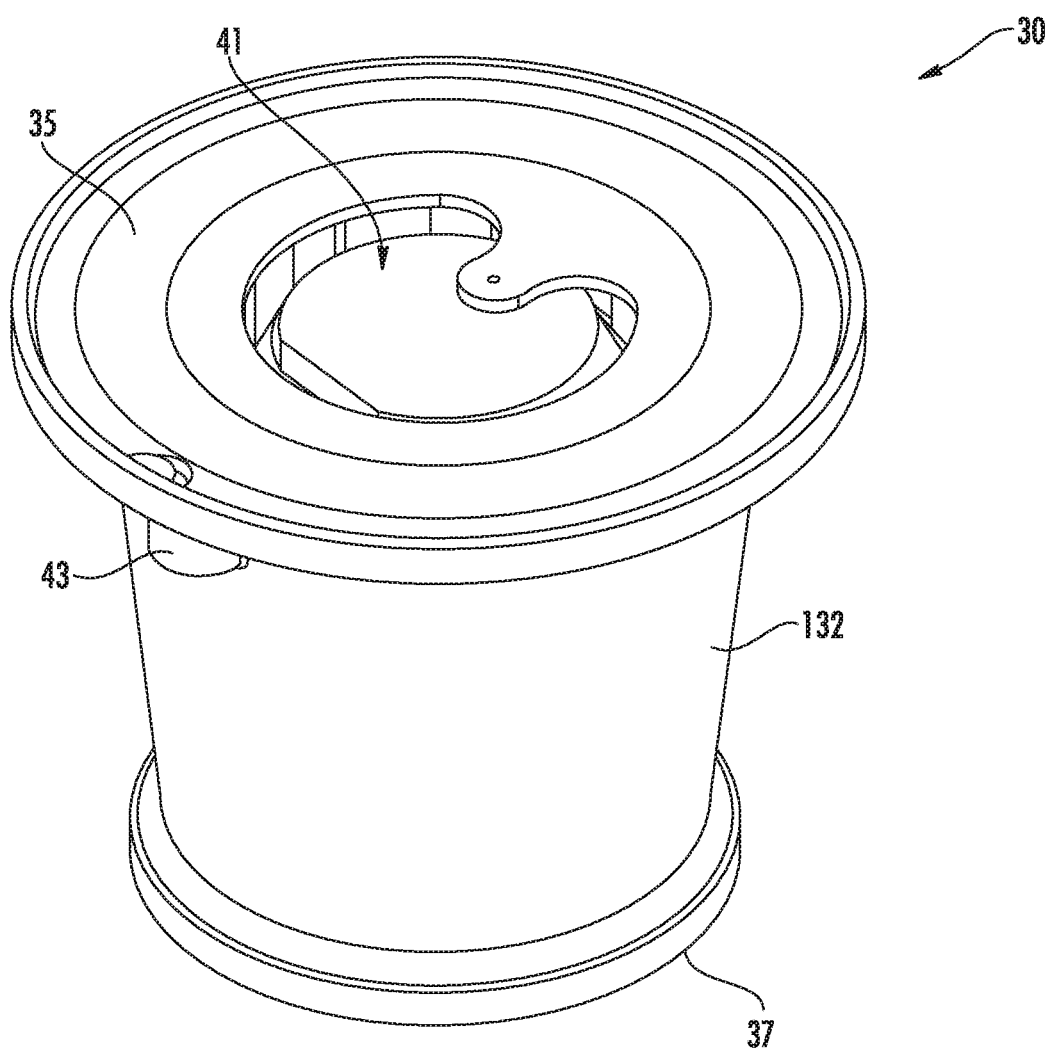
FIGS. 5A and 5B illustrate perspective views of an exemplary embodiment of the smoke generation pod of the smoke generator.
Figure 5B:
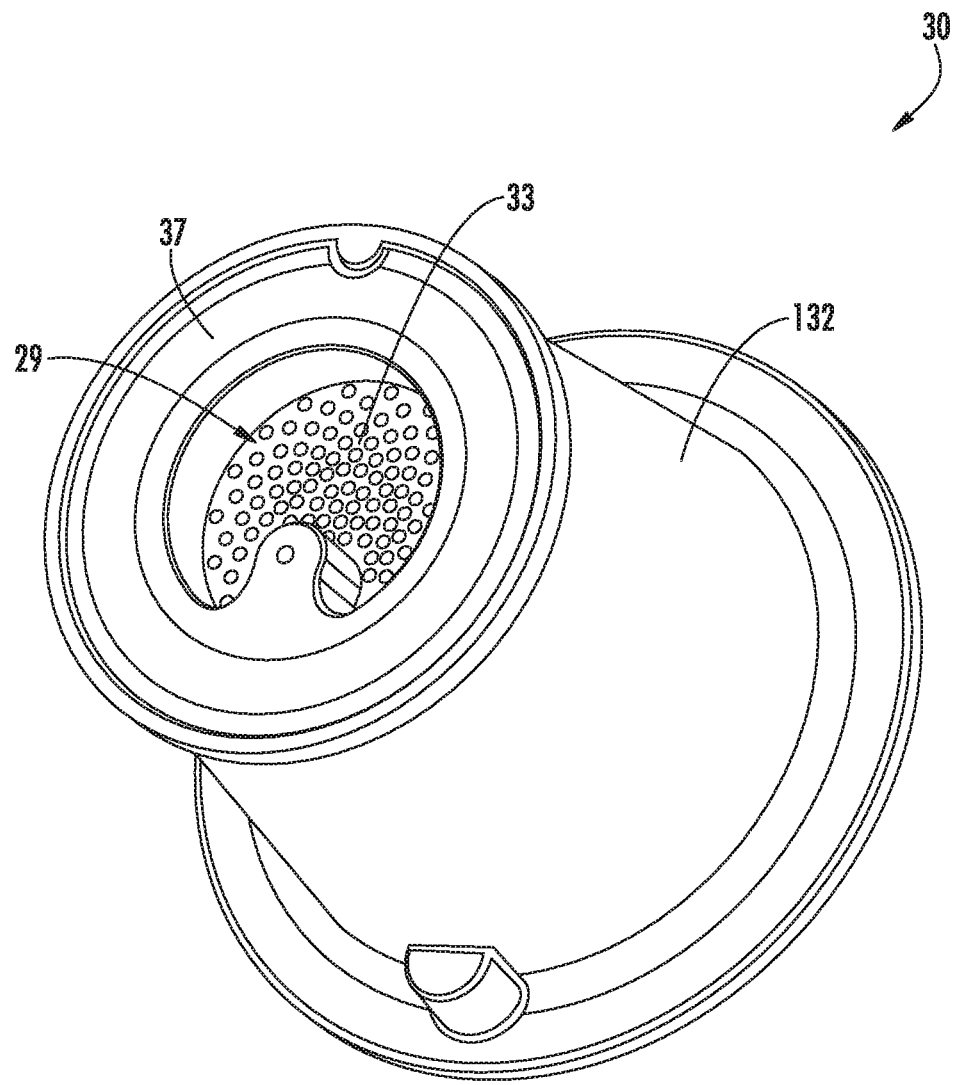

Referring to FIGS. 4A and 4B, perspective views of an exemplary stationary housing 11 for the smoke generation system 10 are shown. The example stationary housing 11 shown is one possible housing for the smoke generation system 10 and, in no way, limits the present invention to any particular physical embodiment (as will be further exemplified). The front of the stationary housing 11 of the smoke generation system 10 includes the display 86 and keypad 91 (e.g. individual buttons). The smoke pod door 14 opens/closes to allow removal/insertion of the smoke generation pod 30 into/out of the pod cavity 19. A sensor (not shown) detects when the smoke pod door 14 is open to prevent operation of the igniter 59/131 while the smoke pod door 14 is open. The smoke pod door 14 also provides for capturing of the smoke 99 and routing the smoke to an object (e.g. a glass 101) resting on a tray 16. The upper portion of the exemplary stationary housing 11 of the smoke generation system 10 connects to the lower portion with the tray 16 by a riser section 12.

In some embodiments, the smoke 99 is routed into a container having there within foodstuff for smoking the foodstuff. For example, the container has there within meat that is to be smoked using the smoke 99.

In some embodiments, the smoke pod door 14 includes a smoke donut 15. After smoke generation is complete, remaining smoke beneath the closed smoke pod door 14 (within the smoke reservoir 18) is pumped out in one or more pulses through the smoke donut 15, creating smoke rings to inform the user that the process is complete. In some embodiments, the smoke donut 15 is illuminated (e.g. with LEDs) to accentuate the smoke ring(s).

In FIG. 4B, the back surface has been removed to show the pump 31. In some embodiments, an exhaust 17 is provided to exhaust internal heat and gases. In such, it is anticipated that a replaceable filter 13 is provided to remove particulate matter from the gases (smoke 99) that are exhausted.

Power is provided as known in the industry, for example using household current, a primary power source (e.g. batteries), or using rechargeable batteries, etc.

Referring to FIGS. 5A, 5B, 6 and 7, views of an exemplary smoke generation pod 30 of the smoke generation system 10 are shown.

In this example, the anode 133 and cathode 135 are housed within a cage 140 within the smoke generation pod 30 (though any ignition system is anticipated). In this embodiment, the anode 133 is electrically interfaced to a first contact 35 and the cathode 135 is electrically interfaced to a second contact 37 on surfaces of the smoke generation pod 30. When the smoke generation pod 30 is inserted into the pod cavity 19, contact is made to provide electrical power to the contacts 35/37 and, hence, a voltage potential between the anode 133 and cathode 135 form an electric arc 131 within the smoke generation pod 30. Being that the electric arc 131 is in the vicinity of the material 38, the electric arc 131 causes the material to smolder, creating the smoke 99.

In some embodiments, the cage 140 within the smoke generation pod 30 is made of metal to preclude melting as the material 38 smolders and generates heat. In such, there is an outer shell 132 that supports the cage 140 within a pod cavity 19 of a smoke generating device. In some embodiments, the outer shell 132 is made of a plastic material that is easy to mold into the desired shape and retains that shape after molding. In a preferred embodiment, there is generally an air gap 134 between the cage 140 and the outer shell 132 to provide thermal and/or electrical insulation from the cage 140 to the outer shell 132, thereby helping to keep the outer shell 132 cooler to the touch as it is anticipated that a user will remove the smoke generation pod 30 from a pod cavity 19 shortly after smoke is generated and the material 38 has heated the cage 140. As mentioned previously, in some embodiments, the mesh filter 33 retains the material 38 and some or all of ashes that are produced during the generation of smoke 99 within the smoke generation pod 30. In some embodiments, a second filter 32 further filters out smaller ash particles (e.g., the second filter 32 is a cellulose acetate fiber material) and, in some embodiments, the second filter 32 also filters out some carcinogens that form from the combustion of the material 38. For example, the combustion of wood produces polycyclic aromatic hydrocarbons (PAHs) which are known carcinogens. Is one such embodiment, the second filter 32 includes or is made of silica-alumina (zeolite) to remove some or a majority of the polycyclic aromatic hydrocarbons (PAHs), thereby reducing carcinogens in the smoke 99.

The smoke generation pod 30 includes an output vent 29 through which the smoke 99 is extracted/escapes from the smoke generation pod 30. In some embodiments, the output vent 29 includes a mesh filter 33 to prevent at least some of the materials and ash from escaping from the smoke generation pod 30. It is anticipated that in some embodiments, the smoke 99 is pulled out of the output vent 29 (and optional mesh filter 33) as air is drawn into the input vent 41 while in other embodiments air is forced into the input vent 41 and the smoke 99 therefore exits through the output vent 29 (and optional mesh filter 33).

In some embodiments, the smoke generation pod 30 includes a registration tab 43 that aligns the smoke generation pod within the pod cavity 19.

Figure 6:
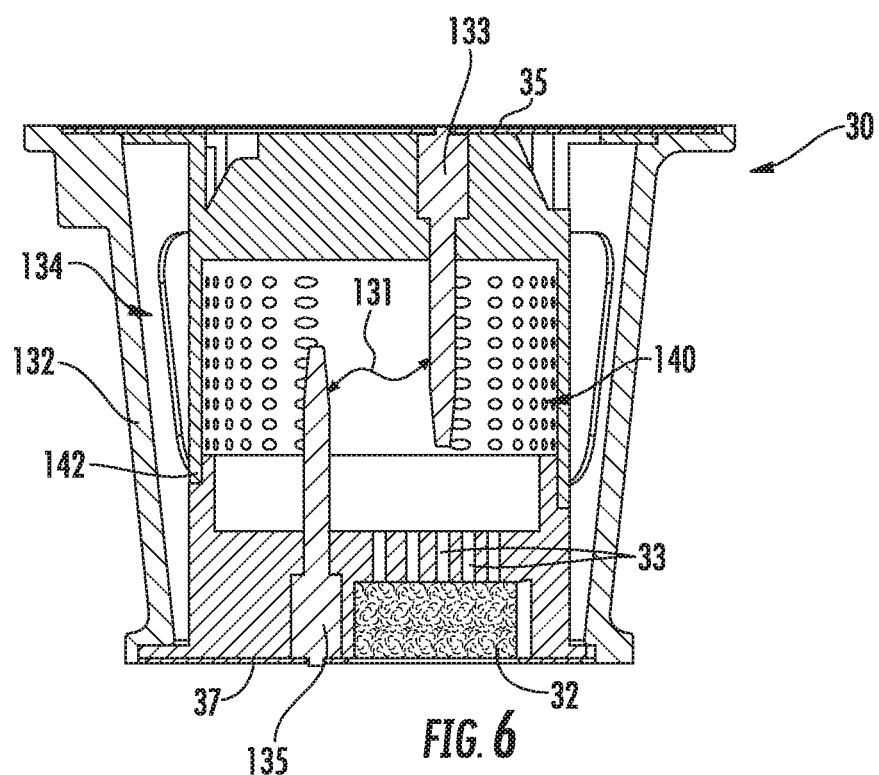
FIGS. 6 and 7 illustrate cross-sectional views of exemplary smoke generation pod of the smoke generator.
Figure 7:
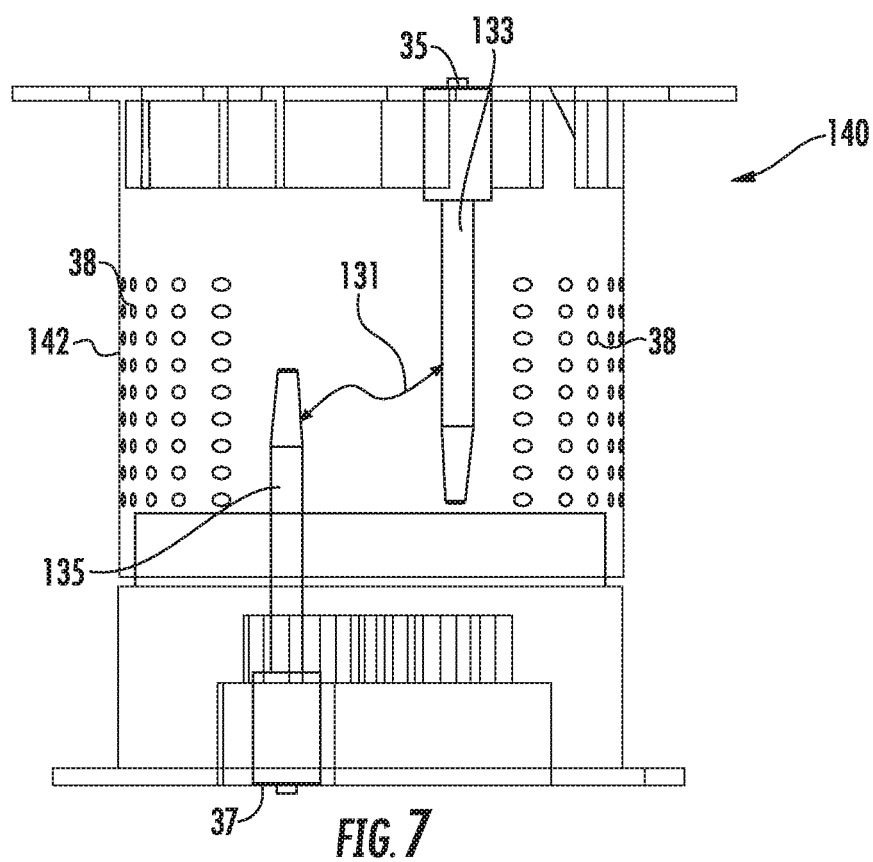

Referring to FIGS. 6 and 7, cross-sectional views of an exemplary smoke generation pod 30 of the smoke generation system 10 are shown. In FIG. 6, the outer structure is shown having there contained the cage 140. The outer structure of the smoke generation pod 30 has an outer wall 132 that is separated from cage 140 by an air gap 134. This air gap 134 helps keep the smoke generation pod 30 cool to the touch. In some such embodiments, another pump 31A (see FIG. 4B) is used to move air through the air gap 134 to provide additional cooling. Alternately, a temperature sensor within the pod cavity 19 is read to monitor the temperature of the smoke generation pod 30 and interlocks are provided (not shown) to prevent removal of the smoke generation pod 30 until a safe temperature is reached.

The cage 140 includes the material 38 that is used to generate the smoke 99, enclosed by an inner smoke generation container 142. It is anticipated that the inner smoke generation container 142 be made of a fire-retardant material to completely contain the smoldering or burning of the material 38 after ignition. Examples of the fire-retardant material include, but are not limited to, steel, aluminum, certain plastics, etc.

In some embodiments, the smoke generation pod 30 is delivered in an airtight container or removable seals cover the output vent 29 and the input vent 41 to keep the material 38 fresh.

In the prior example, the smoke generation system 10 was embodied in a stationary system. Two other smoke generation systems 10 are described below including a hand-held housing 100 and a mixer housing 200.

Figure 8:
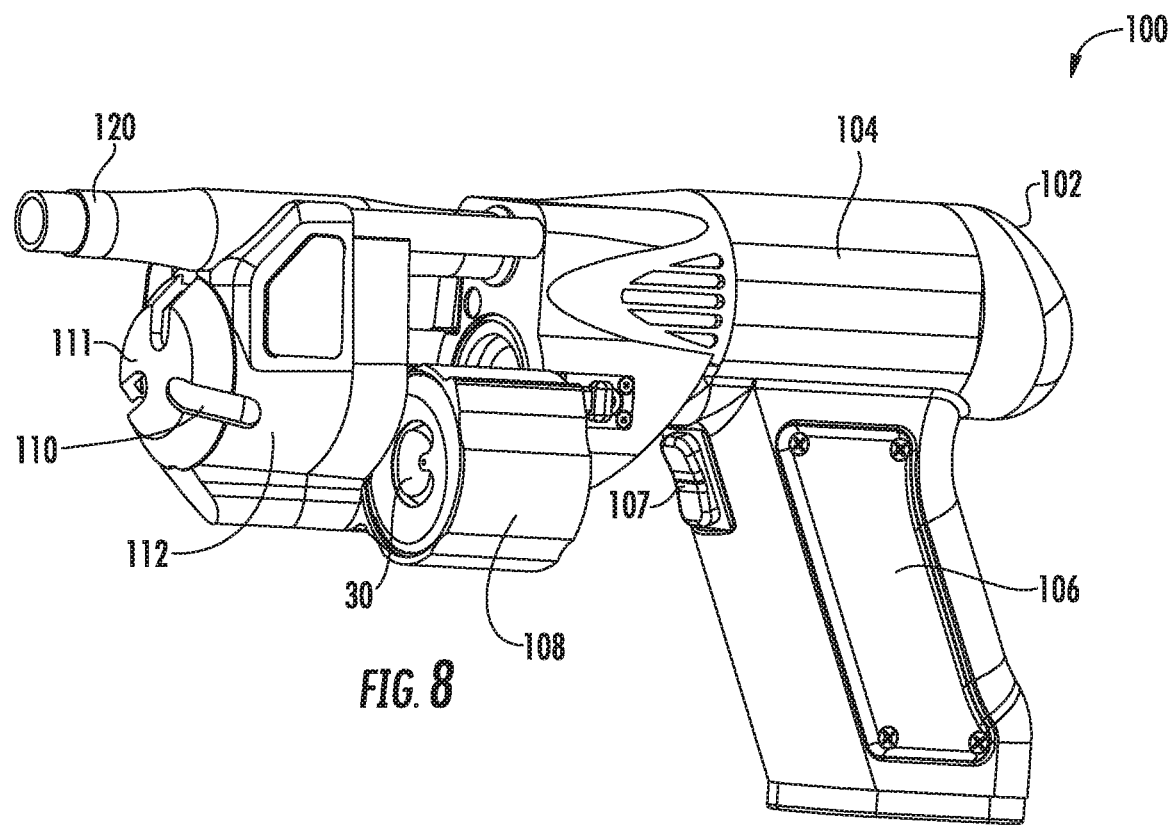
FIGS. 8, 9, and 10 illustrate perspective views of an exemplary hand-held housing for the smoke generator.
Figure 9:
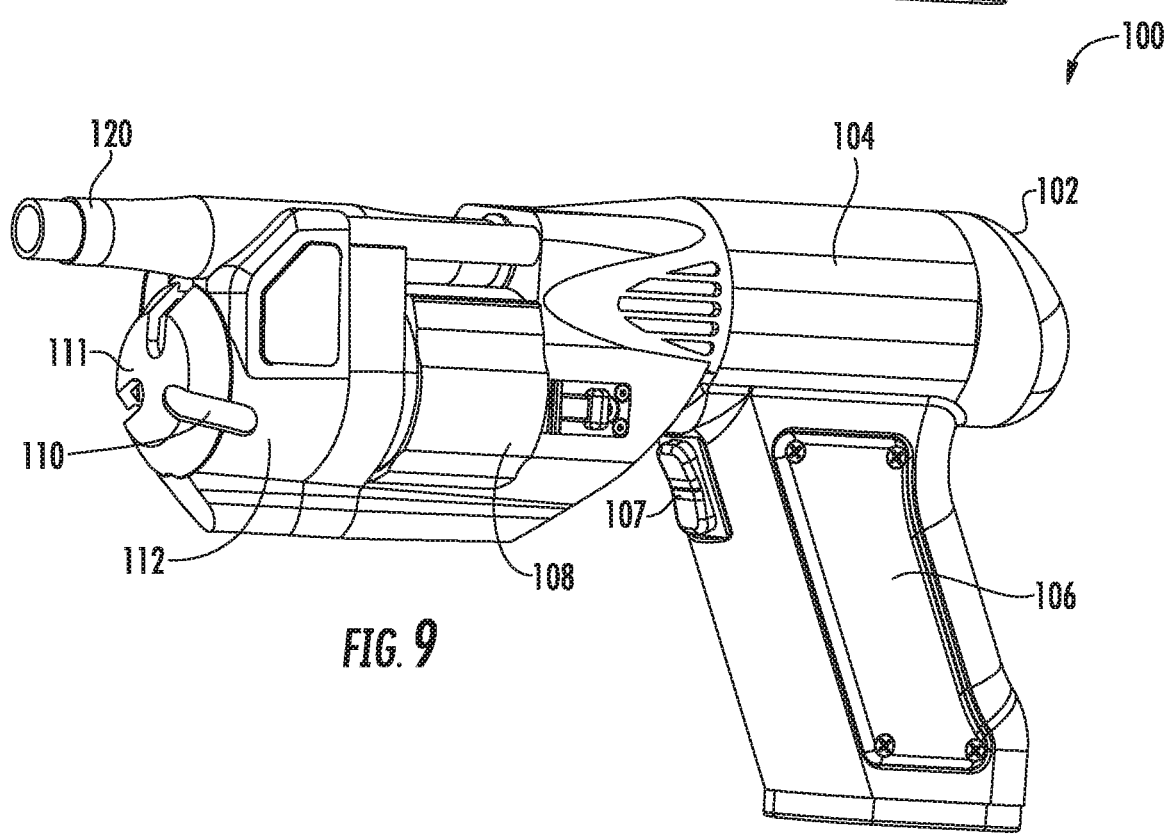
Figure 10:
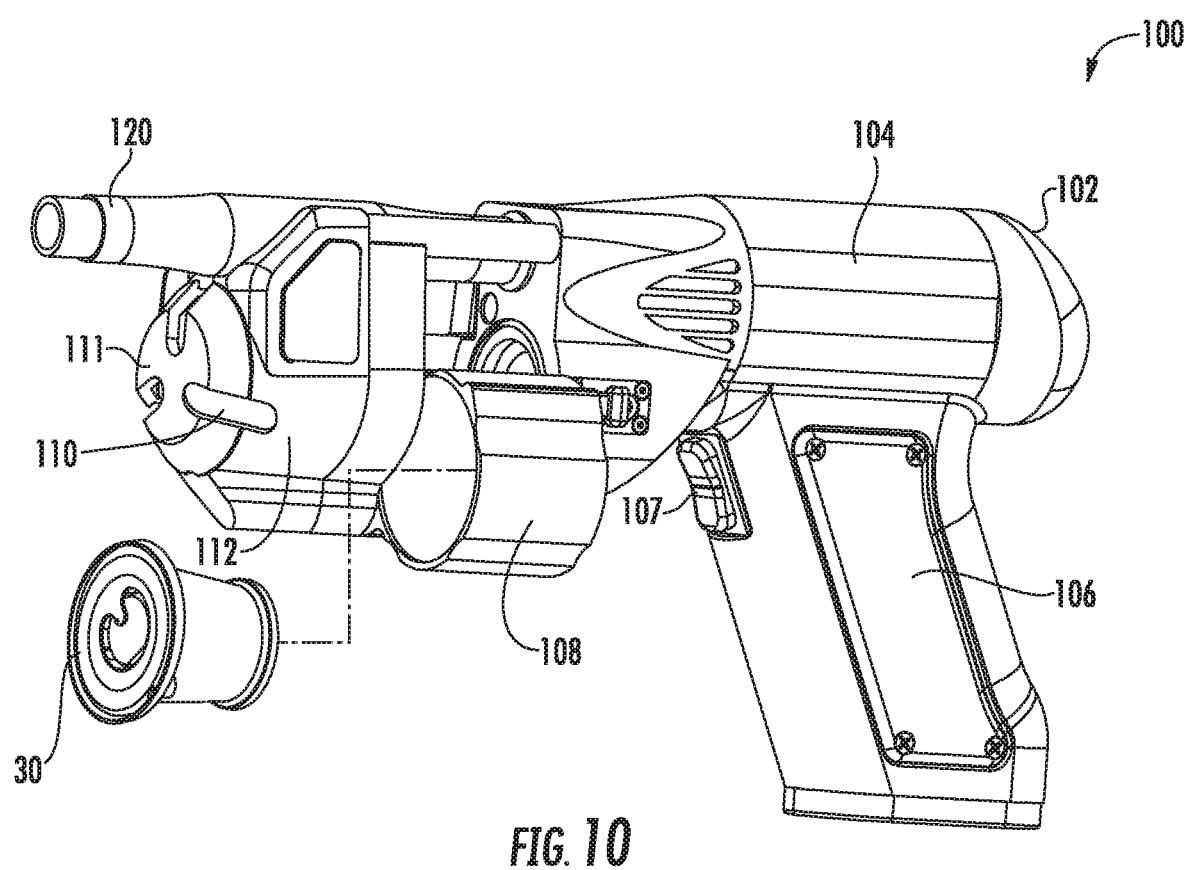
Figure 10A:
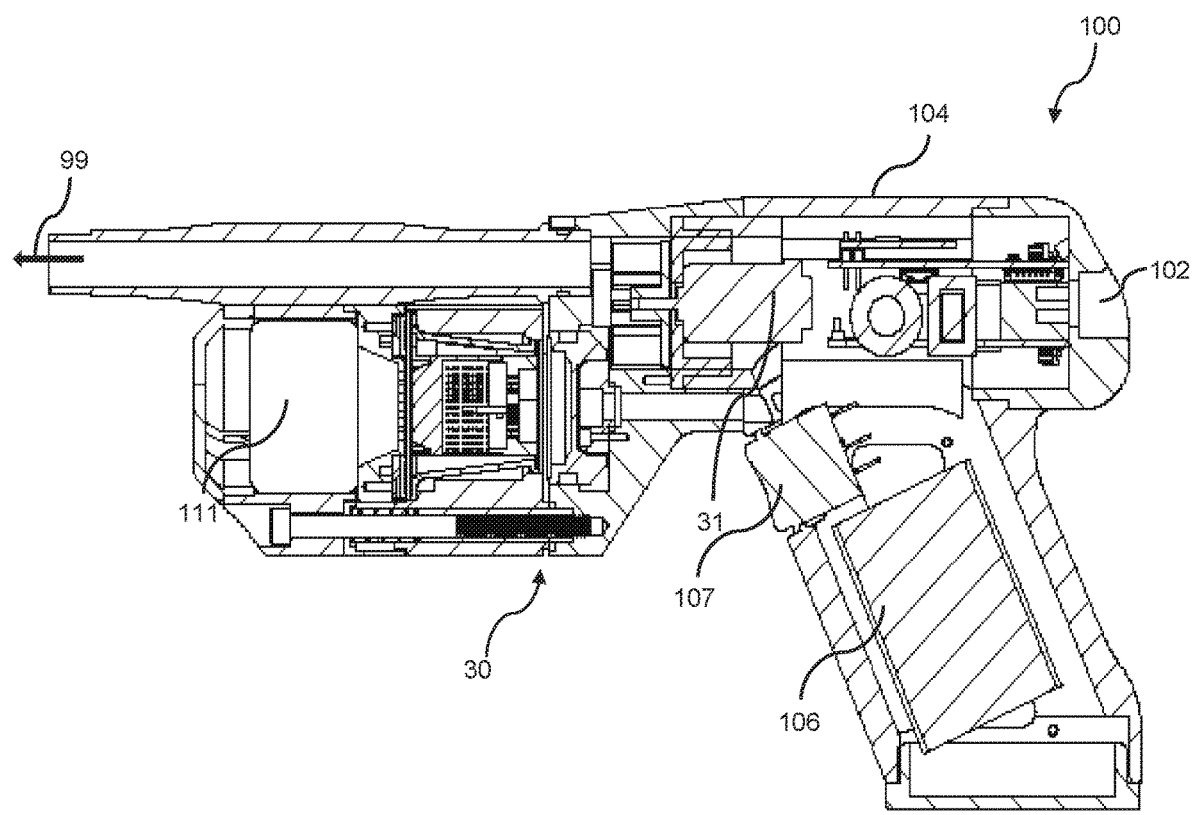
FIG. 10A illustrates a cross-sectional view of the exemplary hand-held housing for the smoke generator.

Referring to FIGS. 8, 9, 10, and 10A, views of an exemplary hand-held housing 100 for the smoke generation system 10 are shown. FIGS. 8, 9, and 10 show perspective views of the exemplary hand-held housing 100 and FIG. 10A shows a cross-sectional view of the exemplary hand-held housing 100. The hand-held housing 100 is another example/embodiment of the smoke generation system 10 that provides a more portable smoke generation device that still accepts the above described smoke generation pod 30. Although three embodiments of smoke generation systems 10 are disclosed, there are no limitations as to the types, sizes, or shapes of such smoke generation systems 10, as there are many embodiments of smoke generation systems 10 anticipated that accept the smoke generation pod 30.

In the hand-held housing 100 of the smoke generation system 10, a housing that simulates a handgun is presented. The muzzle end 120 of the hand-held housing 100 has an orifice through which the smoke 99 will emanate. In some embodiments, the muzzle end 120 includes a camera (not shown). The smoke generation pod 30 fits within and is held within a pod holder 108 that is similarly mounted as a round holder of a handgun. The pod holder 180 swivels outward from the hand-held housing 100 to insert/remove the smoke generation pod 30, then swivels back into the hand-held housing 100 for generation of the smoke 99.

As power is needed to ignite or cause the material to smolder, a battery pack is positioned in the grip portion 106 of the hand-held housing 100. In one embodiments, the battery pack is rechargeable through a connector 102 on the back surface of the hand-held housing 100 (or any other surface), for instances a micro-USB power connector.

The chamber section 104 of the hand-held housing 100 houses some or all of the electronics required to control the pump/fan 31 and to generate the proper power voltage and current to operate the igniter 59 or arc 151.

A trigger 107 controls the electronics to initiate generation of the smoke 99. Pressing the trigger 107 initiates flow of electricity to the pump/fan 31 and to the igniter 59 or arc 151. In this way, it is anticipated that a single smoke generation pod 30 remain within the hand-held housing 100 while the trigger 107 is operated several times to generate several streams of the smoke 99.

In some embodiments, the second filter 32 is housed in the hand-held housing 100 behind a cover 111 that is held to the hand-held housing 100 by latches 110.

Figure 11:
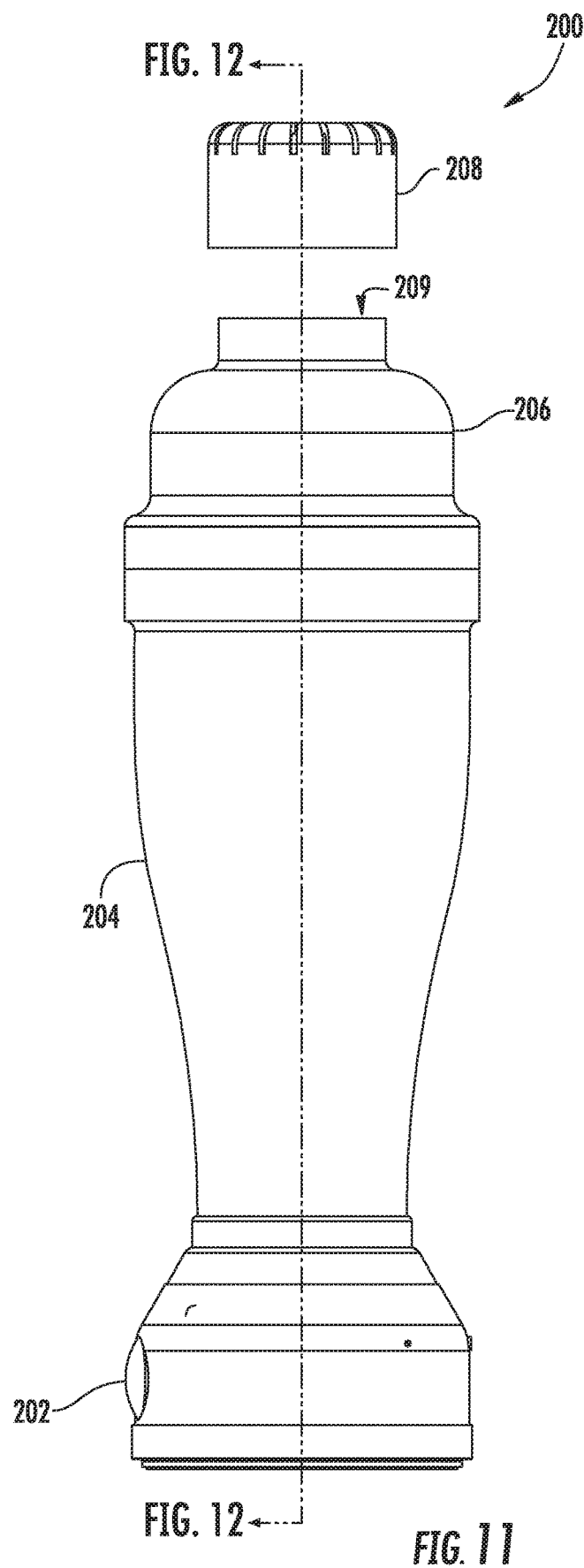
FIGS. 11, 12, and 13 illustrate perspective views of an exemplary housing for the smoke generator that includes a drink mixer.
Figure 12:
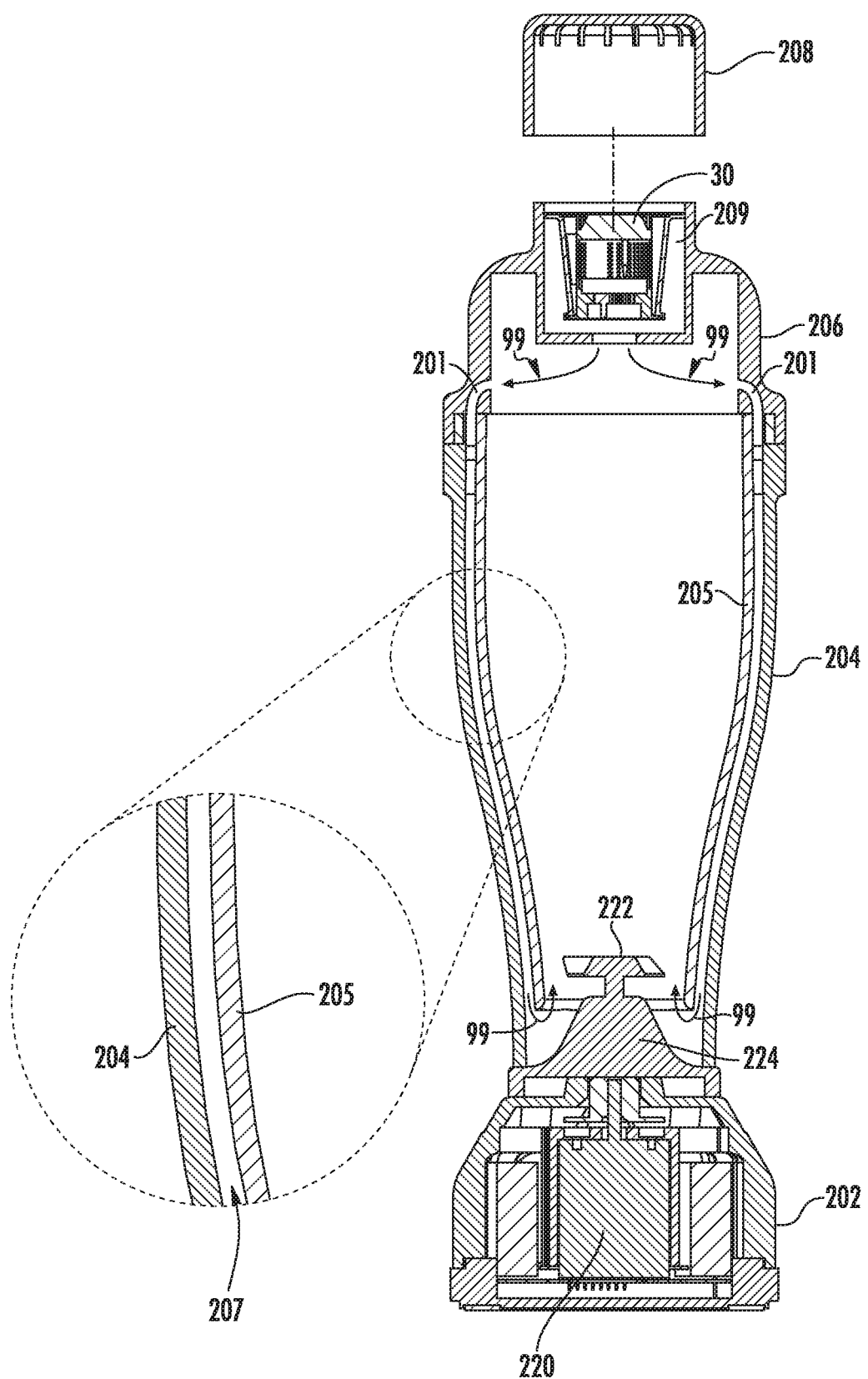
Figure 13:
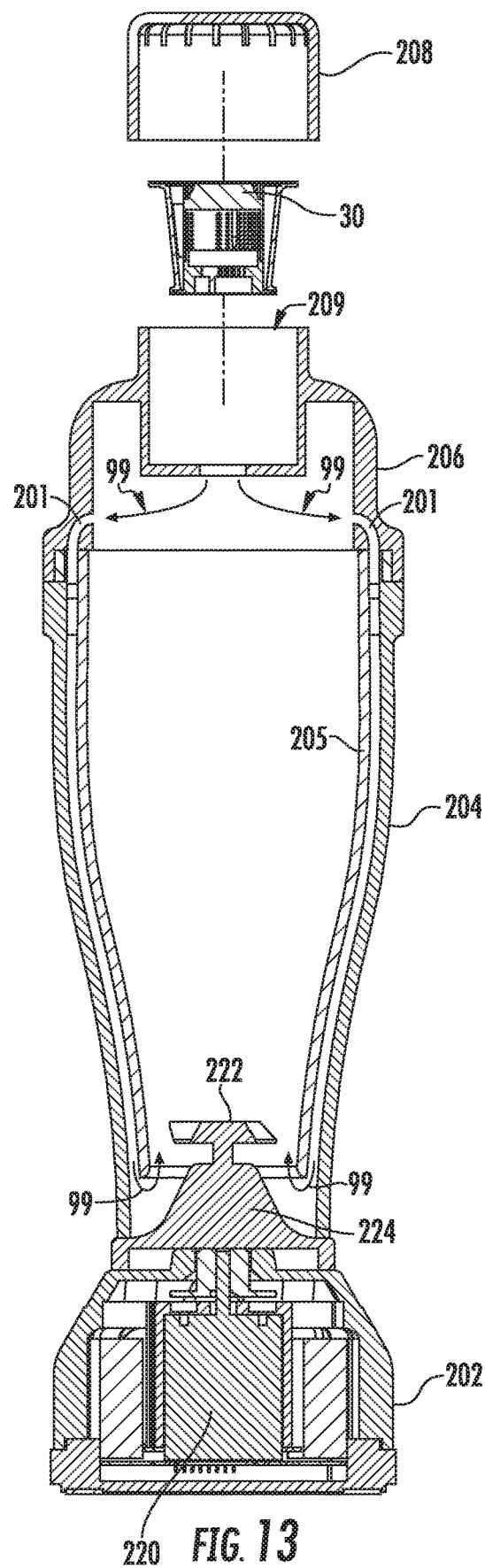

Referring to FIGS. 11, 12, and 13, perspective views of an exemplary mixer housing 200 for the smoke generation system 10 that includes a drink mixer are shown. Again, the mixer housing 200 is another example/embodiment of the smoke generation system 10 that provides a different smoke generation device that still accepts the above described smoke generation pod 30. Although three embodiments of smoke generation systems 10 are disclosed, there are no limitations as to the types, sizes, or shapes of such smoke generation systems 10, as there are many embodiments of smoke generation systems 10 anticipated that accept the smoke generation pod 30.

The mixer housing 200 resembles a drink mixer often used for mixing drinks, often alcohol-based drinks. The difference being is that the mixer housing 200 of the smoke generation system 10 includes a receptacle 209 that accepts a smoke generation pod 30 and the mixer housing 200 of the smoke generation system 10 includes control electronics and passages to route the smoke 99 into a liquid/solid that is located within the canister 204 of the mixer housing 200. In this way, the mixer housing 200 mixes drinks while infusing the smoke 99 into the drinks.

The mixer housing 200 has a receptacle 209, typically located at the top of the canister 204, which removably accepts a smoke generation pod 30. In some embodiments, a cover 208 having vents 203 covers the receptacle 209 (and smoke generation pod 30 when present), the vents 203 allowing outside air to enter the input vent 41 of the smoke generation pod 30.

A base portion 202 of the mixer housing 200 contains the electronics and a motor 220 for mixing the drinks by way of a blade 222 that is coupled to the motor 220. In some embodiments, the motor 220 is a multi-speed motor as known in the industry.

Smoke exiting the output vent 29 (and optional mesh filter 33) travels from the smoke generation pod 30 from the receptacle 209 through the cover 206, through ports 201 in the cover that interface with a passageway 207. The smoke then travels through the passageway 207 between an inner wall 205 and an outer wall of the canister 204 of the canister 204. The passageway 207 moves the smoke 99 to a lower portion of the canister 204 (e.g. at a lower level of the liquid or solid that is within the canister 204, so that the smoke 99 enters into the liquid though a filter or mesh 224 that has large enough pores to allow the smoke 99 to raise up into the liquid or solid within the canister 204, yet the pores are small enough so that molecules of the liquid cannot pass and wind up in the passageway 207. In alternate embodiments, the filter or mesh 224 includes a one-way valve, so that the smoke, under pressure from the pump/fan 31 will enter into the liquid or solid within the canister 204, but any liquid or fine particles of solids will not travel in the reverse direction into the passageway 207.

There are no limits on the location and size of the passageway 207. In one embodiment, the passageway completely encircles the canister 204, while in some embodiments, the passageway 207 is only located on a small portion of a side of the canister 204, or the passageway 207 is a small tube that runs external or internal to the canister 204.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A smoke generation pod comprising:
    a housing having an input vent, an output vent, and an internal chamber;
    a material within the internal chamber;
    an electrical igniter extending inwardly through the housing and into the internal chamber thereby placing the electrical igniter in contact with the material; and
    a plurality of electrical contacts on an outside surface of the housing, wherein each of the plurality of electrical contacts are electrically connected to the igniter;
    whereas, upon application of an electric potential across the plurality of electrical contacts, the material emits smoke and the smoke emanates from the output vent as aft replaces the smoke via the input vent.

2. The smoke generation pod of claim 1, further comprising a filter on the output vent, the filter retaining within the internal chamber the material and at least some ashes formed when the material emits smoke.

3. The smoke generation pod of claim 2, wherein the filter comprises silica-alumina for the reduction of carcinogens.

4. The smoke generation pod of claim 1, further comprising a screen on the input vent, the screen retaining within the internal chamber at least some of the material.

5. The smoke generation pod of claim 1, further comprising an identification device within or attached to the housing, the identification device accessible electrically or wirelessly from outside of the housing.

6. The smoke generation pod of claim 5, wherein the identification device comprises a read-only serial number.

7. The smoke generation pod of claim 5, wherein the identification device comprises a write-once, read-many usage count register.

8. The smoke generation pod of claim 5, wherein the identification device comprises an identification of a type of the material.

9. The smoke generation pod of claim 5, wherein the identification device is a radio-frequency identification device (RFID).

10. The smoke generation pod of claim 1, wherein the material comprises wood particles.

11. The smoke generation pod of claim 1, wherein the housing is hermetically sealed.

12. A smoke generation pod comprising:
    a hermetically sealed housing having an input vent, an output vent having a filter, and an internal chamber containing a material;
    an electrical igniter passing through a wall of the housing and protruding into the internal chamber, wherein the electrical igniter in contact with the material; and
    electrical contacts on an outside surface of the housing, wherein the electrical contacts are electrically connected to the igniter;

whereas, upon application of an electric potential across the plurality of electrical contacts, the material emits smoke and the smoke emanates from the output vent as air replaces the smoke via the input vent.

13. The smoke generation pod of claim 12, wherein the filter comprises silica-alumina for the reduction of carcinogens.

14. The smoke generation pod of claim 12, further comprising an identification device within or attached to the hermetically sealed housing, the identification device accessible electrically or wirelessly from outside of the hermetically sealed housing.

* * * * *